United States Patent
Tomasi et al.

[11] Patent Number: 5,546,380
[45] Date of Patent: Aug. 13, 1996

[54] METHOD FOR SUPERVISING TDMA RADIO FREQUENCY COMMUNICATIONS

[75] Inventors: Peter A. Tomasi, Buffalo Grove; Mark E. Prill, Lake Zurich; Stephen V. Cahill, Palatine, all of Ill.

[73] Assignee: Motorola, Inc., Schaumburg, Ill.

[21] Appl. No.: 378,987

[22] Filed: Jan. 24, 1995

Related U.S. Application Data

[63] Continuation of Ser. No. 72,791, Jun. 4, 1993, abandoned.

[51] Int. Cl.$^6$ .................................................. H04J 3/14
[52] U.S. Cl. .................. 370/17; 370/95.1; 370/95.3; 370/110.1; 455/54.1; 455/67.1
[58] Field of Search .................... 395/550; 370/95.3, 370/95.1, 110.1, 100.1, 105.4, 13, 17, 106, 18; 455/33.1, 34.1, 34.2, 54.1, 54.2, 56.1, 59, 60, 32.1, 38.1, 38.2, 68, 67.1, 70; 371/5.4, 5.5, 5.3, 5.1, 5.2, 47.1; 375/231, 232

[56] References Cited

U.S. PATENT DOCUMENTS

| | | | |
|---|---|---|---|
| 3,562,710 | 4/1968 | Halleck | 371/5.1 |
| 4,876,740 | 10/1989 | Levine et al. | 455/33.1 |
| 4,984,290 | 1/1991 | Levine et al. | 455/33.1 |
| 5,008,953 | 4/1991 | Dahlin et al. | 455/33.1 |
| 5,182,753 | 1/1993 | Dahlin et al. | 370/110.1 |
| 5,199,031 | 3/1993 | Dahlin et al. | 370/95.1 |
| 5,408,639 | 4/1995 | Gulick et al. | 395/550 |

*Primary Examiner*—Wellington Chin
*Assistant Examiner*—Huy D. Vu
*Attorney, Agent, or Firm*—Kevin D. Kaschke

[57] ABSTRACT

A unique method for supervising a cellular telephone call between a base station and a radio telephone of a TDMA cellular communications system includes the steps of determining (304) that the assigned time slot is expected to be received within a predetermined amount of time; detecting the presence of the assigned time slot (306) within the predetermined amount of time; detecting the presence of the assigned DVCC when the assigned time slot is detected (308); incrementing a bad slot counter (316) [if] responsive to the assigned time slot is not detected within the predetermined amount of time or [if] responsive to the assigned DVCC is not detected; and terminating the communication (322) [if] when the bad slot counter reaches a predetermined maximum value. A good slot counter is incremented (310) when the assigned DVCC is detected in a burst. The good slot counter is reset (318) [if] when the assigned DVCC is not detected in the next burst, and both counters are reset (314) [if] when the assigned DVCC is detected in consecutive bursts.

4 Claims, 3 Drawing Sheets

METHOD FOR SUPERVISING TDMA RADIO FREQUENCY COMMUNICATIONS

This is a continuation of application Ser. No. 08/072,791, filed Jun. 4, 1993 and now abandoned.

BACKGROUND OF THE INVENTION

The present invention is generally related to cellular telephone systems, and more particularly to an improved method for supervising time-division-multiple-access (TDMA) radio frequency (RF) communications in TDMA cellular telephone systems.

In TDMA cellular telephone systems, base station transmitters transmit different digital verification color codes (DVCCs) on active TDMA time slots of RF channels for enabling cellular telephones to determine if they are receiving their desired base station transmitter. The DVCCs are specified in TIA/EIA Interim Standard IS-54, paragraphs 2.4.3.1, 2.4.3.3 and 2.6.5.1, published by and available from the EIA Engineering Publications Office, 2001 Pennsylvania Ave., N.W., Washington, D.C. 20006. According to a prior technique complying with the IS-54 Standard, the DVCC being received on an active TDMA time slot during a telephone call is compared to the DVCC assigned during call setup or handoffs. If two consecutively received DVCCs match, then the telephone call may continue. If five consecutively received DVCCs do not match, then a five second timer is initiated. If two matching DVCCs have not been consecutively received during the five second time interval, then the cellular telephone call is terminated since the desired base station transmitter is no longer being received. However, such prior technique requires the use of a reasonably accurate internal timer, thereby necessitating additional hardware or software. Furthermore, the time base of this internal timer must match the time base of the base station in order to reliably meet the IS-54 Standard. For the foregoing reasons, there is a need for an improved method for supervising TDMA RF communications in TDMA cellular telephone systems, which does not rely on a timer and is simpler and more reliable than prior techniques.

SUMMARY OF THE INVENTION

The present invention encompasses a new method for supervising the communication between a base station and a subscriber station of radio communications system of the type in which digitally-encoded information is communicated therebetween in bursts. Each burst includes a plurality of time slots, and at least some of the bursts include DVCCs. A subscriber station is assigned a time slot and a DVCC for each communication. The novel method for supervising the communication between the base station a subscriber station includes the steps of determining that the assigned time slot is expected to be received within a predetermined amount of time; detecting the presence of the assigned time slot within the predetermined amount of time; detecting the presence of the assigned DVCC when the assigned time slot is detected; incrementing a bad slot counter [if] responsive to the assigned time slot is not detected within the predetermined amount of time or [if] responsive to the assigned DVCC is not detected; and terminating the communication [if] when the bad slot counter reaches a predetermined maximum count.

DESCRIPTION OF THE PREFERRED EMBODIMENT

Figure 1:
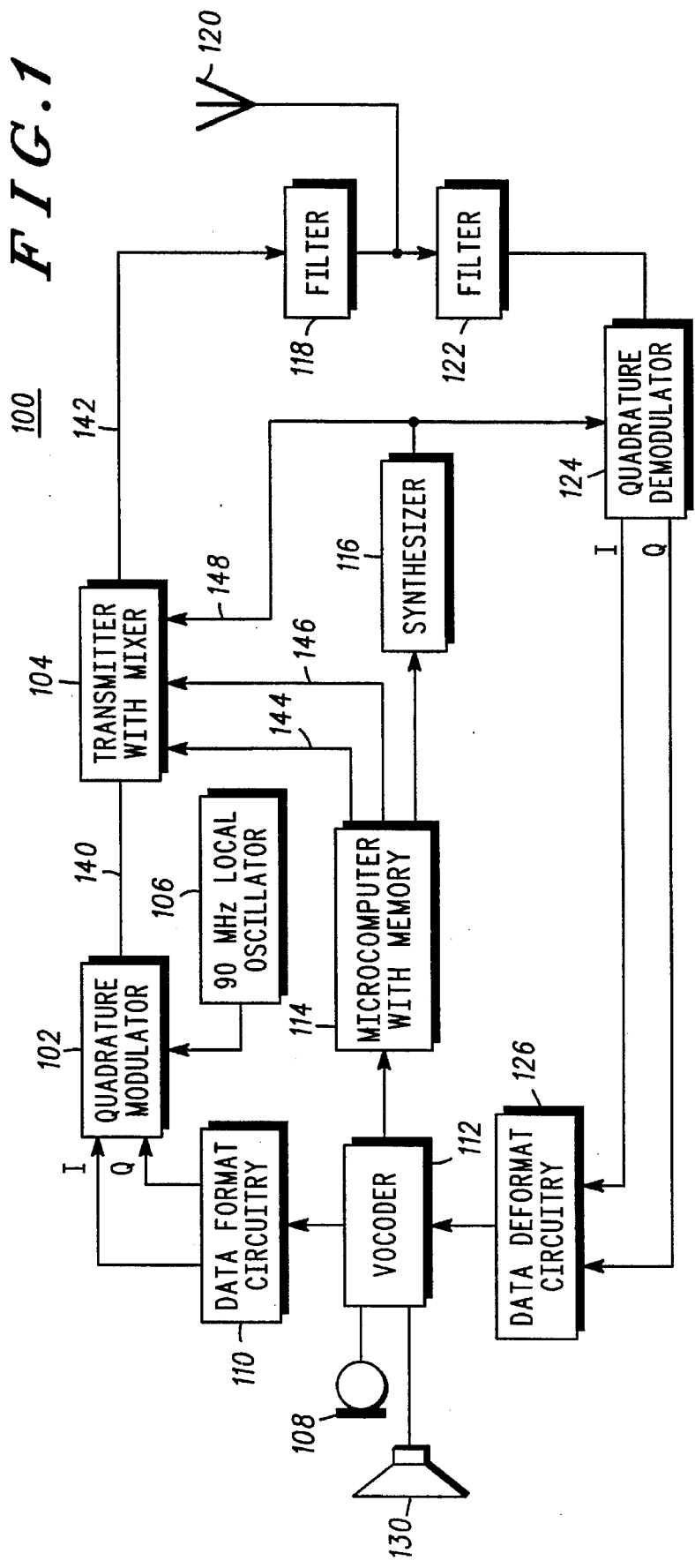
FIG. 1 is a block diagram of a TDMA cellular telephone, which may advantageously utilize the improved method for supervising subscriber TDMA RF communications embodying the present invention.

Referring to FIG. 1, there is illustrated a block diagram of a TDMA cellular telephone 100, which may advantageously utilize the improved method for supervising TDMA RF communications embodying the present invention. A TDMA cellular telephone system typically includes one or more base stations which communicate bursts of digitally-encoded information via RF channels to active subscriber stations, such as TDMA cellular telephone 100. Each burst includes a plurality of time slots, and at least some of the bursts include DVCCs. During communication, the subscriber station is assigned a time slot and a DVCC for the duration of that communication. TDMA cellular telephone 100 may be a mobile, handheld portable, or transportable telephone, each of which may in turn be coupled to a modem, facsimile machine, computer, or other device or system.

TDMA cellular telephone 100 includes, in its transmit signal path, microphone 108, vocoder 112, data format circuitry 110, quadrature modulator 102, 90 MHz local oscillator 106, transmitter with mixer 104, transmitter filter 118, and antenna 120. In its receive signal path, TDMA cellular telephone 100 includes antenna 120, receiver filter 122, quadrature demodulator 124, and data deformat circuitry 126. The channel frequency of TDMA cellular telephone 100 is loaded into synthesizer 116 by microcomputer 114 and applied to transmitter 104 and demodulator 124. In the preferred embodiment, the duplex radio channels have transmit frequencies in the range from 824 MHz to 849 MHz and receive frequencies in the range from 869 MHz to 894 MHz. TDMA cellular telephone 100 is controlled by microcomputer 114 which includes a memory with a control and signaling computer program stored therein. In TDMA cellular telephone 100, microcomputer 114 may be implemented with commercially available microcomputers, such as, for example, the Motorola type 68HC11 microcomputer.

In TDMA cellular telephone 100 in FIG. 1, transmitter with mixer 104 may be implemented as described in the instant assignee's U.S. Pat. No. 5,193,223, entitled "Power Control Circuitry For A TDMA Radio Frequency Transmitter", invented by Thomas J. Walczak et al. and granted Mar. 9, 1993 (incorporated herein by reference). Transmitter 104 includes power control circuitry comprised of variable gain stage, a mixer, a bandpass filter, and a directional coupler in a forward path, and a diode detector, an analog-to-digital converter, a digital controller, and a digital-to-analog converter in a feedback path.

Transmitter 104 is responsive to timing signal 144, power level signals 146 and synthesizer output signal 148 for amplifying transmit IF signal 140 to produce transmit output signal 142. Timing signal 144 has a waveform defining a series of transmit intervals, which correspond to one of three possible time slots TS1, TS2, and TS3 for a TDMA RF channel. The TDMA RF channel consists of multiple frames of 40 milliseconds each containing three time slots TS1, TS2, TS3, TS1, TS2, and TS3. Each time slot is approximately 6.67 milliseconds in duration and occurs twice in each frame. In other TDMA cellular systems, each 40 millisecond frame may contain six time slots, TS1, TS2, TS3, TS4, TS5, and TS6.

During a cellular telephone call in a TDMA cellular system, TDMA cellular telephone 100 is assigned to a TDMA RF channel and a time slot of that channel for transmission of the modulated transmit output signal 142 carrying voice signals, signalling information, and overhead information. For example, a telephone 100 may be assigned to time slot TS2 of a particular channel. Transmit output signal 142 is transmitted at a desired power level selected by the power level signals 146 during each assigned time slot.

In TDMA cellular telephone 100 in FIG. 1, quadrature modulator 102 may be implemented as described in the instant assignee's U.S. Pat. No. 5,020,076, entitled "Hybrid Modulation Apparatus", invented by Stephen V. Cahill et al. and granted May 28, 1991 (incorporated herein by reference). Quadrature modulator 102 modulates TDMA RF signals with voice, data and signalling information according to $\pi/4$-shift differential quadrature phase shift keying (DQPSK). DQPSK modulation is described in "Digital Communications", by John G. Proakis, 1st Ed., ISBN 0-07-050927-1, at pages 171–178. Data format circuitry 110 combines the output of vocoder 112 with signalling and overhead information and encodes the result according to $\pi/4$-shift DQPSK modulation into the transmit I and Q signals. The $\pi/4$-shift DQPSK modulation and signalling information is specified in the aforementioned EIA/TIA Interim Standard IS-54.

The signal vector representing the $\pi/4$-shift DQPSK modulation consists of a cosine component and a sine component. The signal scaling the amplitude of the cosine component is also known as the in-phase or I signal and the signal scaling the amplitude of the sine component is also known as the quadrature or Q signal. The I and Q scaled cosine and sine signals are the orthogonal quadrature components at the frequency of the 90 MHz signal from local oscillator 106; the modulated transmit IF signal 140 then being created by adding the I and Q signals.

Symbols representing the vector components of the I and Q signals are generated in data format circuitry 110 by shifting the vector components such that phase shifts of IF signal 102 of $\pm\pi/4$ or $\pm\pi/4$ radians are generated. Each phase shift encodes one of four possible symbols.

Serial digital data from vocoder 112 that is eventually to be modulated by modulator 102 is first converted to bit pairs in data format circuitry 110. Each bit pair specifies a symbol that is the desired vector shift relative to the previously transmitted symbol. The mapping of bit pairs to symbol vectors is according to the equations:

$$I(k)=I(k-1) \cos (\Delta\phi(X(k),Y(k)))-Q(k-1) \sin (\Delta\phi(X(k),Y(k)))$$

$$Q(k)=I(k-1) \sin (\Delta\phi(X(k),Y(k)))+Q(k-1) \cos (\Delta\phi(X(k),Y(k)))$$

where k is an index of the bit pairs; k=1 for bits one and two paired, k=2 for bits three and four paired, etc. I(k−1) and Q(k−1) are the amplitudes of the cosine and sine components of the previous symbol vector. X(k) represents the first bit of bit pair (k) and Y(k) represents the second bit of bit pair (k). The phase change, $\Delta\phi$, is determined according to the following table:

| X(k) | Y(k) | $\Delta\phi(X(k),Y(k))$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

Thus, one of four possible symbols are transmitted for each two bits of the serial data stream.

The reason for the modulation nomenclature $\pi/4$-shift DQPSK and how it works is now evident: the phase shift is in $\pi/4$ increments in vector space, symbols are differentially encoded with respect to the previous symbol vector, and the information bearing quantity in transmit IF signal 140 is the phase-shift with one of four possible shifts between any two symbols. The operation of modulator 102 is represented by the equation:

$$V_{out}(t)=(I(t)) \cos (2\pi ft)+(Q(t)) \sin (2\pi ft)$$

where $V_{out}(t)$ is the modulated IF signal 102 and I(t) and Q(t) are I(k) and Q(k) as defined above as a function of time, and f is the transmit IF of 90 MHz.

In TDMA cellular telephone 100 in FIG. 1, quadrature demodulator 124 may be implemented as described in the instant assignee's U.S. Pat. No. 5,150,384, entitled "A Carrier Recovery Method and Apparatus Having an Adjustable Response Time Determined by Carrier Signal Parameters", invented by Stephen V. Cahill, and granted Sep. 22, 1992 (incorporated herein by reference). Quadrature demodulator 124 demodulates TDMA RF signals modulated with information according to $\pi/4$-shift DQPSK and generates the receive I and Q signals. The receive I and Q signals are deformated and decoded by data deformat circuitry 126 to recover the digitized voice signals, which are applied to vocoder 112.

In TDMA cellular telephone 100 in FIG. 1, vocoder 112 may be implemented as described in the instant assignee's U.S. Pat. Nos. 4,817,157 and 4,896,361 (incorporated herein by reference). Vocoder 112 encodes and decodes voice signals according to code excited linear prediction (CELP) coding. Filters 118 and 122 are intercoupled as a duplexer for transmitting TDMA RF signals on, and receiving TDMA RF signals from antenna 120. Filters 118 and 122 may be any suitable conventional filters, such as, for example, the filters described in U.S. Pat. Nos. 4,431,977, 4,692,726, 4,716,391, and 4,742,562 (incorporated herein by reference). Vocoder 112, data format circuitry 110, data deformat circuitry 126, quadrature modulator 102, and quadrature demodulator 124 may be implemented with commercially available digital signal processors, such as, for example, the Motorola type DSP 56000 digital signal processor.

Figure 2:
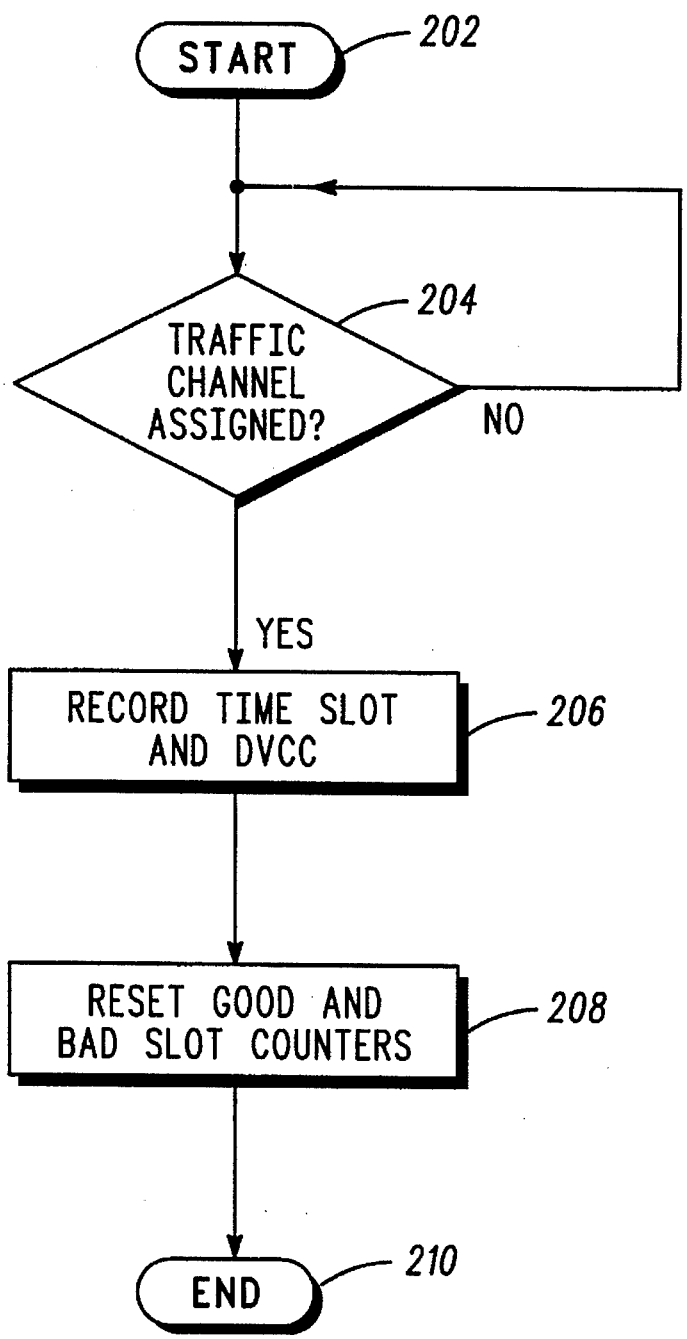
FIG. 2 is a flow chart for the process used by microcomputer 114 in FIG. 1 for obtaining a traffic channel assignment.

Referring next to FIG. 2, there is illustrated a flow chart for the process executed by microcomputer 114 in FIG. 1 for obtaining a traffic channel assignment, including assignment of a time slot and a DVCC for that channel. Entering at START block 202, the process proceeds to decision block 204, where a check is made to determine if a traffic channel has been assigned. If not, NO branch is taken to wait. A traffic channel is an RF communications channel on which TDMA cellular telephone 100 communicates with a base station during a cellular telephone call. If a traffic channel has been assigned, YES branch is taken to block 206 where the assigned time slot and assigned DVCC are recorded in the memory of microcomputer 114. Next, at block 208, the good and bad slot counters are reset to initialize them to zero. The process then returns to other tasks at END block 210.

Figure 3:
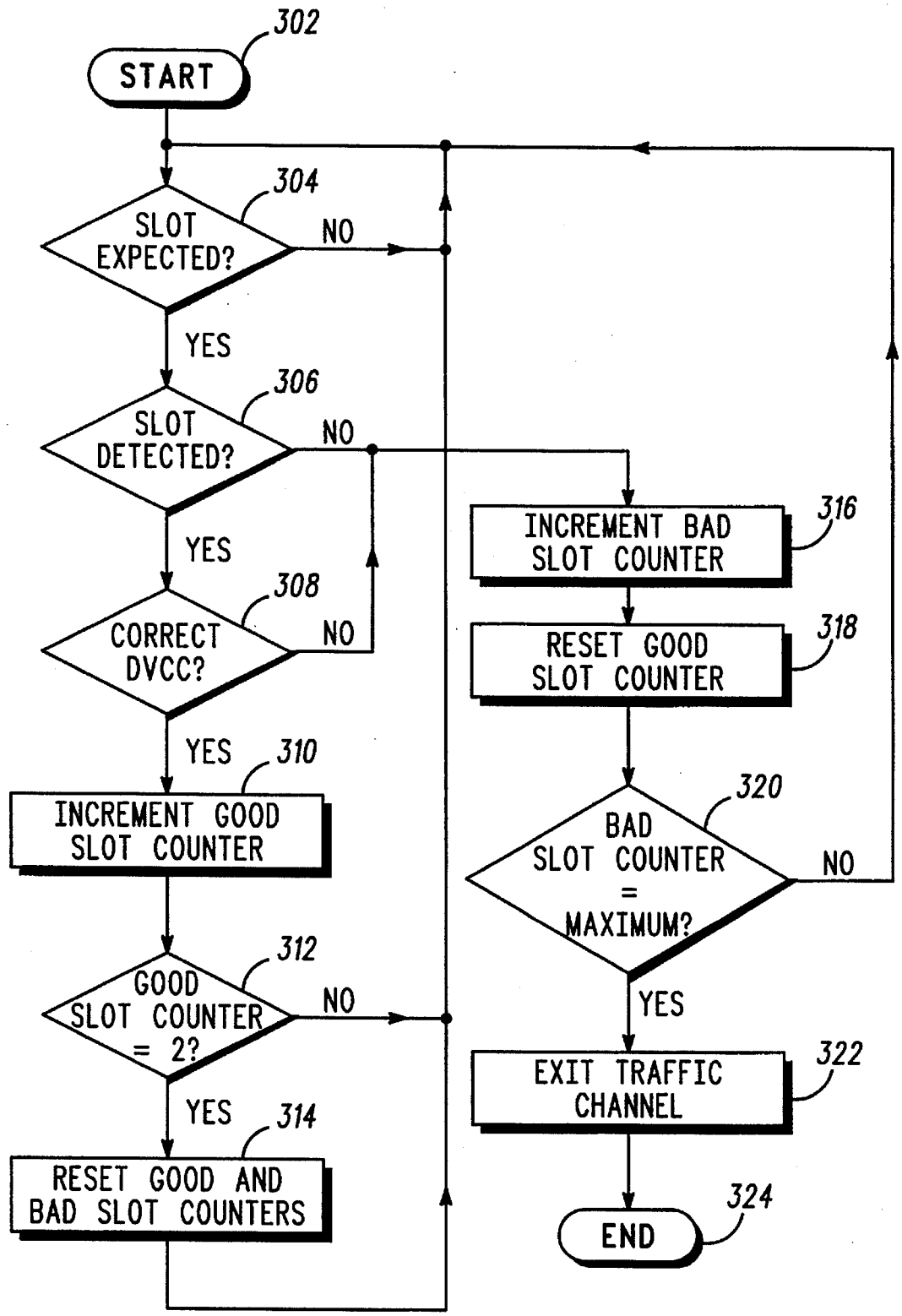
FIG. 3 is a flow chart for the process used by microcomputer 114 in FIG. 1 for monitoring the DVCC of the assigned traffic channel.

Referring next to FIG. 3, there is illustrated a flow chart for the process executed by microcomputer 114 in FIG. 1 for monitoring the assigned time slot and assigned DVCC of the assigned traffic channel. Entering at START block 302, the process proceeds to decision block 304, where a check is made to determine if the assigned time slot is expected to be received. If not, NO branch is taken to wait. Since each time slot occurs twice in a 40 millisecond frame, the wait time is approximately 20 milliseconds.

When the 20 millisecond wait time elapses, YES branch is taken from decision block 304 to decision block 306, where a check is made to determine if the assigned time slot has been detected. The assigned time slot is detected by proper receipt of a predetermined 28-bit synchronization word associated with the assigned time slot. Each of the time slots has a different predetermined 28-bit synchronization word (see the aforementioned IS-54 Standard). If the proper 28-bit synchronization word has been detected, YES branch is taken from decision block 306 to decision block 308, where a check is made to determine if the DVCC received during the assigned time slot matches the assigned DVCC stored in the memory of microcomputer 114. If so, YES branch is taken from decision block 308 to block 310, where the good slot counter is incremented. The good slot counter is a value stored in a predetermined location of the memory of which is incremented and reset by microcomputer 114.

Next, at decision block 312, a check is made to determine if the good slot counter is equal to two. If not, NO branch is taken to return to decision block 304 to repeat the foregoing process for the next assigned time slot. If the good slot counter is equal to two, YES branch is taken from decision block 312 to block 314, where the good and bad slot counters are reset to zero. Thereafter, program control returns to decision block 304 to repeat the foregoing process for the next assigned time slot.

Returning to decision blocks 306 and 308, NO branch is taken from both to block 316, where the bad slot counter is incremented. The bad slot counter is also a value stored in a predetermined location of the memory of which is incremented and reset by microcomputer 114. The bad slot counter is incremented when the assigned time slot is not detected at decision block 306, or when the assigned DVCC is not detected at decision block 308. Next, at block 318, the good slot counter is reset to zero. Then, at decision block 320, a check is made to determine if the bad slot counter is equal to the maximum count, which is 255 in the preferred embodiment. The count of 255 represents detection of 5 bad DVCCs and thereafter detection of at least 250 bad DVCCs. Since good DVCCs should be received every 20 milliseconds, it takes at least 5 seconds to detect 250 bad DVCCs. During good signal conditions, a time slot will be detected at decision block 306 essentially all of the time. Time slots will cease to be detected when telephone 100 goes into a poor signal area or out of range of the nearest base station.

If the bad slot counter is not equal to the maximum count of 255, NO branch is taken from decision block 320 to return to decision block 304 to repeat the foregoing process for the next assigned time slot. However, if the bad slot counter is equal to the maximum count of 255, YES branch is taken from decision block 320 to block 322, where microcomputer 114 exits from the assigned traffic channel. At this point communication with the base station is no longer possible so the telephone call is terminated by exiting the assigned traffic channel. Thereafter, the process returns to other tasks at END block 324.

In summary, a unique method for supervising TDMA RF communications in TDMA cellular telephone systems accurately and reliably determines if the assigned time slot and assigned DVCC are being received during communication between TDMA cellular telephone 100 and the base station. The novel method is time slot-locked in that receipt of the assigned time slot is confirmed by detection of the proper predetermined 28-bit synchronization word in the burst. Furthermore, timing offsets between the time base of the base station and the time base of the subscriber station can not cause improper termination of a telephone call, since incorrect DVCCs are accumulated only after detection of the assigned time slot.

We claim:

1. In a radio communications system in which digitally-encoded information is transmitted between a base station and subscriber stations in bursts over radio channels, each burst including a plurality of time slots, and at least some of the bursts including digital verification color codes DVCCs, a subscriber station being assigned a time slot and a DVCC for each communication, a method for supervising the communication between the base station and a subscriber station comprising the steps of:

determining that the assigned time slot is expected to be received within a predetermined amount of time;

detecting the presence of the assigned time slot within the predetermined amount of time;

detecting the presence of the assigned DVCC when the assigned time slot is detected;

incrementing a first counter responsive to the assigned time slot not being detected within the predetermined amount of time or responsive to the assigned DVCC not being detected; and terminating the communication when the first counter reaches a predetermined maximum count.

2. The method according to claim 1, further including the step of:

resetting the first counter when the assigned DVCC is detected in consecutive bursts.

3. The method according to claim 1, further including the steps of:

incrementing a second counter when the assigned DVCC is detected in a burst; and resetting the second counter when the assigned DVCC is not detected in the next burst.

4. The method according to claim 3, further including the step of:

resetting the first counter when the assigned DVCC is detected in consecutive bursts.

* * * * *